(12) United States Patent
Rabeler (10) Patent No.: US 8,650,439 B2
(45) Date of Patent: Feb. 11, 2014

(54) APPARATUS AND METHOD FOR FAULT TOLERANT FOTA UPDATE

(75) Inventor: Bryan Eugene Rabeler, Keller, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 97 days.

(21) Appl. No.: 13/307,230

(22) Filed: Nov. 30, 2011

(65) Prior Publication Data
US 2012/0144279 A1 Jun. 7, 2012

Related U.S. Application Data

(60) Provisional application No. 61/420,632, filed on Dec. 7, 2010.

(51) Int. Cl.
| | |
|---|---|
| G06F 11/00 | (2006.01) |
| G06F 11/16 | (2006.01) |
| G06F 11/10 | (2006.01) |
| H03M 13/00 | (2006.01) |
| H04M 3/00 | (2006.01) |
| H04W 24/00 | (2009.01) |
| G06F 9/44 | (2006.01) |
| G06F 9/00 | (2006.01) |
| G06F 15/177 | (2006.01) |

(52) U.S. Cl.
USPC ........... 714/6.3; 714/6.31; 714/807; 455/418; 455/419; 455/423; 717/171; 717/173; 713/2

(58) Field of Classification Search
None
See application file for complete search history.

(56) References Cited

U.S. PATENT DOCUMENTS

| | | | | |
|---|---|---|---|---|
| 7,689,981 | B1 * | 3/2010 | Gustafson | 717/168 |
| 2005/0114852 | A1 * | 5/2005 | Chen et al. | 717/168 |
| 2006/0130046 | A1 * | 6/2006 | O'Neill | 717/168 |
| 2007/0150524 | A1 * | 6/2007 | Eker et al. | 707/203 |
| 2008/0216066 | A1 * | 9/2008 | Oh | 717/173 |
| 2011/0004871 | A1 * | 1/2011 | Liu | 717/173 |

* cited by examiner

*Primary Examiner* — Guerrier Merant
(74) *Attorney, Agent, or Firm* — Jefferson IP Law, LLP (57) ABSTRACT

An apparatus and method for fault tolerant Firmware-Over-The-Air (FOTA) update are provided. The method includes computing a checksum for each sector of a partially updated firmware, for each sector of the partially updated firmware, determining a last instruction in an update package that was applied to that sector, based on checksums included in the update package and the computed checksums of the sectors of the partially updated firmware, determining a last instruction of the update package that was applied to the partially updated firmware prior to the interruption based on the last instruction applied to each sector, and resuming the update procedure starting from an instruction immediately following the last applied instruction.

27 Claims, 8 Drawing Sheets

APPARATUS AND METHOD FOR FAULT TOLERANT FOTA UPDATE

CROSS-REFERENCE TO RELATED APPLICATIONS

This application claims the benefit under 35 U.S.C. §119 (e) of a U.S. Provisional application filed on Dec. 7, 2010 in the U.S. Patent and Trademark Office and assigned Ser. No. 61/420,632, the entire disclosure of which is hereby incorporated by reference.

BACKGROUND OF THE INVENTION

1. Field of the Invention

The present invention relates to an apparatus and method for Firmware-Over-The-Air (FOTA). More particularly, the present invention relates to an apparatus and method for fault tolerant FOTA updating.

2. Description of the Related Art

Mobile terminals have been developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

Software to control a mobile terminal is typically stored as firmware. Typically, in order to update the firmware, the user had to download an entire copy of the updated firmware, and then install the updated firmware on the mobile terminal. In many cases, the user had to download the updated firmware to a desktop or laptop computer to which the mobile terminal was attached, instead of controlling the updating process directly from the mobile terminal.

Recently, the concept of Firmware-Over-The-Air (FOTA) has been introduced. In this technique, an update package is delivered to the mobile terminal wirelessly. The update package includes a series of instructions which, when applied to the existing firmware, update the firmware to the newer version. An update client stored on the mobile terminal executes the instructions in the update package to modify the existing firmware and produce the updated version. Generally, the update package only includes the information needed to update the existing firmware to the new version. The update package does not include data corresponding to the portion of the firmware that is not being updated. As a result, the size of the update package is reduced.

However, problems may occur if a power loss occurs during the update process. The firmware is stored in non-volatile memory, usually either NAND flash or NOR flash. Flash memory is organized into sectors (also referred to as blocks) with a typical size between 64 KB and 256 KB. In order to modify any byte in a particular sector, the entire sector should be erased before the sector can be written to. Erasing a sector causes all the bytes to be set to 0xFF. Because of this restriction, modifying a sector is not an atomic operation; power loss in the middle of this process can cause the contents of the sector currently being updated to be in an unpredictable state. It is therefore advantageous to provide methods for fault tolerant FOTA update so that the update client can recover from power loss and resume the update successfully.

At least two major issues arise in the development of fault tolerant FOTA update methods. The first is to backup the current content of the sector about to be modified because that sector must be erased prior to updating. If a power loss occurs immediately after the sector is erased, the original content of that sector is likely needed to generate the updated content. This is referred to as the 2-phase commit algorithm.

The second issue is how the update client, when initialized after a power loss event, determines if the update has started and if so, where to resume the update. One solution to this problem is to maintain a journal which records information about each flash sector operation that has occurred. The update client can read this journal and determine which sector was last being modified at the time of power loss. However, this solution requires dedicated non-volatile memory space (generally two sectors) and requires additional sector writes during the update process, which increases update time.

Another solution to the above issue is to include checksums (also referred to as signatures) for each sector in the update package. The update client can use these checksums to determine for each sector, whether the sector has been modified, and where to resume the update. According to one exemplary implementation, the memory banks are analyzed in order. For each memory bank, the update client generates a checksum on the contents of that bank and compares this checksum to the checksum stored in the update package. The first bank whose checksum does not match its corresponding checksum stored in the update package is assumed to be the next bank to be updated. However, the remaining sectors are assumed to have their original content if a checksum does not match.

According to another proposed solution, the stored firmware image (stored in non-volatile memory) is categorized as one of four possibilities: original version, intermediate version, updated version, or alien version. This determination is made by comparing the signature of each stored block with both the original signature for that block and the updated signature for that block stored in the update package. A block is considered an original block if the signature on its stored content matches the original signature in the update package. A block is considered an updated block if the signature on its stored content matches the updated signature in the update package.

In addition, it is possible for at most one block to be corrupted due to power loss. A corrupted block is neither an original block nor an updated block. If this occurs, that block can be restored from the backup block only if the restored block can be considered an original block or an updated block. However, in this process, each block can only be updated once. Once a block is changed from an original block to an updated block, the block can never be changed again while the current update package is being applied. This is because the process determines whether a block is an updated block belonging to the updated version via the updated signature for that block stored in the update package. If a block can be updated more than once, then not only does the update package need to include a unique "updated signature" for each update, but the process for determining where to resume the update is significantly more complicated and is not obvious.

It is advantageous for the update client to have the ability to update a sector more than once when applying an update package. Each instruction in the update package may modify a particular sector, but these instructions cannot simply be put in any order in the update package. Since the update is performed in-place, each instruction modifies the stored firmware and thus each subsequent instruction must be careful not to read any of the modified parts of the firmware, because those parts do not contain content belonging to the old firmware.

The issue of reading after writing is often referred to as a Read-After-Write (RAW) conflict. If the instructions need to be placed in an order whereby each sector is only updated once, then this order is likely to force many RAW conflicts which must be resolved by either increasing the update package size or utilizing additional backup buffer space on the target. If the instructions can be placed in any order, then an order can be generated which minimizes the number of RAW conflicts. Accordingly, there is a need for a fault-tolerant FOTA update process which can reduce the size of the update package and the amount of space needed on the mobile terminal for the update process.

SUMMARY OF THE INVENTION

Aspects of the present invention are to address at least the above-mentioned problems and/or disadvantages and to provide at least the advantages described below. Accordingly, an aspect of the present invention is to provide an apparatus and method for a fault tolerant Firmware-Over-The-Air (FOTA) update using instruction oriented checksums.

In accordance with an aspect of the present invention, a method for recovering from an interruption in an update procedure for updating a firmware of a mobile terminal is provided. The method includes computing a checksum for each sector of a partially updated firmware, for each sector of the partially updated firmware, determining a last instruction in an update package that was applied to that sector, based on checksums included in the update package and the computed checksums of the sectors of the partially updated firmware, determining a last instruction of the update package that was applied to the partially updated firmware prior to the interruption based on the last instruction applied to each sector, and resuming the update procedure starting from an instruction immediately following the last applied instruction.

In accordance with another aspect of the present invention, a terminal having a firmware updatable by a Firmware-Over-The-Air (FOTA) update operation is provided. The terminal includes a communication unit for receiving an update package for a firmware, the update package comprising a plurality of instructions, each instruction modifying exactly one sector of the firmware, a storage unit having the firmware stored thereon, and a processor for, when an update process to update the firmware based on the update package is interrupted such that the firmware stored on the storage unit is a partially updated firmware: computing a checksum for each sector of the partially updated firmware, for each sector of the partially updated firmware determining a last instruction in the update package that was applied to that sector based on checksums included in the update package and the computed checksums of the sectors of the partially updated firmware, determining a last instruction of the update package that was applied to the partially updated firmware prior to the interruption, and resuming the update procedure starting from an instruction immediately following the last applied instruction.

In accordance with another aspect of the present invention, a method for generating an update package for updating a firmware stored in a terminal is provided. The method includes generating a plurality of instructions, each instruction modifying exactly one sector of the firmware, for each sector of an original firmware, generating a checksum corresponding to that sector, and assigning the checksum a negative instruction number, generating a plurality of checksums corresponding to the plurality of instructions, assigning each checksum an instruction number corresponding to the instruction number of the corresponding instruction, inserting the generated plurality of instructions and any associated content into the update package, and inserting the generated checksums into the update package.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
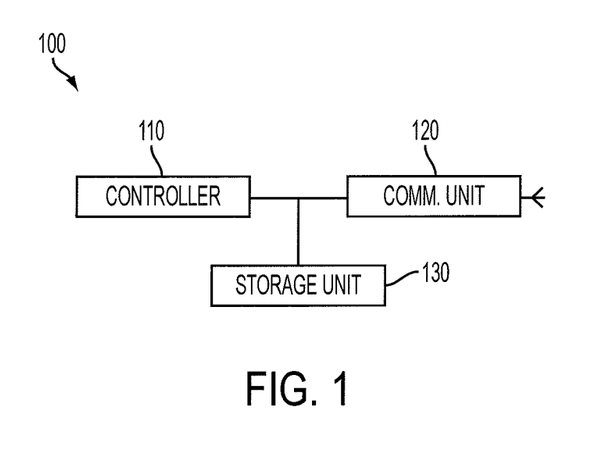
FIG. 1 is a diagram of a mobile terminal according to an exemplary embodiment of the present invention.

FIG. 1 is a diagram of a mobile terminal according to an exemplary embodiment of the present invention.

Referring to FIG. 1, the mobile terminal 100 includes a controller 110, a communication unit 120, and a storage unit 130. The mobile terminal 100 may also include other units not illustrated in FIG. 1 for purposes of clarity. For example, the mobile terminal 100 may include a display unit, an input unit, a speaker, a microphone, a camera, and various other units. The nature and functionality of these additional units may depend on the particular type of mobile terminal. The mobile terminal 100 may be, for example, a smartphone, a feature phone, a Personal Digital Assistant (PDA), a music player, a personal entertainment device, or the like.

The communication unit 120 communicates with a wireless communication network. The communication unit 120 may include an Radio Frequency (RF) transmitter (not shown) for up-converting the frequency of transmitted signals and amplifying the transmitted signals, and an RF receiver (not shown) for low-noise amplifying of received RF signals and down-converting the frequency of the received RF signals. The communication unit 120 receives a Firmware-Over-The-Air (FOTA) update package from the wireless communication network. The controller 110 updates firmware in the storage unit 130 using the update package.

The controller 110 controls overall operations of the mobile terminal 100. When the mobile terminal 100 receives an FOTA update package, the controller 110 controls the mobile terminal 100 such that the firmware in the storage unit 130 is updated to reflect the changes contained in the update package. This process generally involves executing the instructions in the update package in order. When an instruction needs to modify a particular sector, the controller 110 reads the sector into a Random Access Memory (RAM) buffer, and applies the instruction to the copy in the RAM buffer. Once the instruction has been successfully applied, the controller 110 copies the sector in the RAM buffer to a backup sector in flash memory. Then, the original sector is erased and replaced by the backup sector. The controller 110 repeats this process for each instruction until the update is complete.

Occasionally, the mobile terminal 100 may experience a power loss during the update process, or the update process may otherwise terminate unexpectedly. When the mobile terminal 100 initializes after the power loss event, the firmware will be in a partially updated state, in which some portions of the firmware have been updated and other portions have not. The controller 110 attempts to recover from the interruption by comparing a series of checksums in the update package with the partially updated firmware.

The results of the comparison indicate whether the update process can be recovered, and, if so, the last successfully completed instructions. If the comparison indicates that the update process can be recovered, the controller 110 restarts the update from the last successfully completed operation. If the update process cannot be recovered, the controller 110 returns an error code indicating that the update process cannot be recovered. The mobile terminal 100 may perform an appropriate action based on this error code. An exemplary process for the comparison is described below with respect to FIGS. 3-8.

Figure 2:
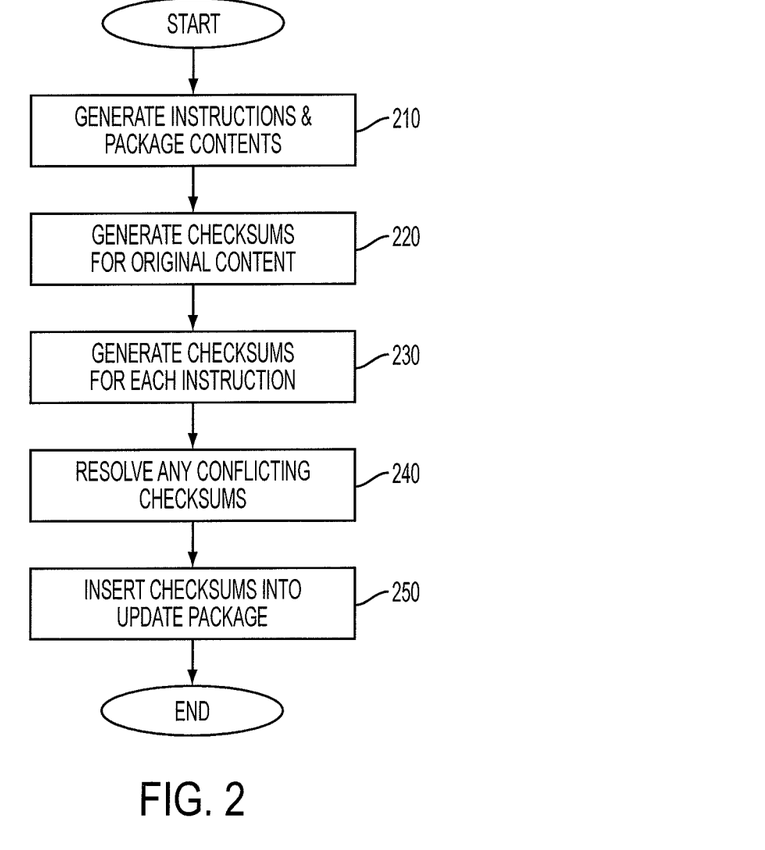
FIG. 2 illustrates a method of generating an update package according to an exemplary embodiment of the present invention.

FIG. 2 illustrates a method of generating an update package according to an exemplary embodiment of the present invention.

Referring to FIG. 2, a delta generator generates a series of instructions and associated content in step 210. The instructions tell the controller 110 how to update the existing firmware. Each instruction modifies one sector of the firmware, which typically range from 64-256 KB. A given sector may be modified by more than one instruction. For example, a first instruction may modify sector 1, a second instruction may modify sector 4, and a third instruction may modify sector 1 again.

In step 220, the delta generator generates a checksum for each sector that includes the original firmware. These checksums represent the original state of the firmware before any instructions in the update package are applied.

In step 230, the delta generator generates a checksum for each instruction. The checksum represents the state of the sector modified by the instruction after the instruction has been carried out. The checksum does not necessarily represent the final state of the sector after the entire update has been completed. Since a sector can be modified by more than one instruction, a checksum representing the state of a sector after one instruction has been applied will not represent the state of that sector after a later instruction is applied to the same sector.

Each instruction modifies exactly one sector. Instructions that modify more than one sector may be broken down into a series of "sub-instructions", each of which modify exactly one sector. Alternatively, a plurality of checksums could be generated for the instructions. In this case, each checksum would represent a state of a corresponding sector after the instruction has been completely applied.

The checksums for the instructions (generated in step 230) are assigned numbers corresponding to their instructions. The first instruction in the update package and its associated checksum is assigned 0, and the second and subsequent instructions are assigned consecutive integers.

The checksums for the original sectors (generated in step 220) do not have corresponding instructions. These checksums represent original sectors, not instructions in the update package. As a result, the checksums for the original sectors cannot be given instruction numbers in the same manner as the checksums for the instructions. Instead, the checksums for the original sectors are assigned negative instruction numbers. Since each instruction assumes that the content of the sector to be modified is in a particular state, the content of these original sectors needs to be present before the update can be applied. Accordingly, these negative instruction numbers reflect prerequisites for the instructions in the update package. These prerequisite instructions do not actually appear in the update package.

Table 1 shows an example of checksums for an update package having five instructions to modify firmware having 3 sectors:

TABLE 1

| Instruction number | Checksum |
| --- | --- |
| −3 | 0xe6f193d32a6b0f0aab7df2a8697f999c |
| −2 | 0x0d5ee8adf3f8a94f096323238d66331a |
| −1 | 0x96f1bf328bd1012ffd3a6b471dca3d0f |
| 0 | 0x790d2832ca2be597f7513f3800cb3f11 |
| 1 | 0x6916265662106ee242d04bf207926b3e |
| 2 | 0x50bb059ff7acdff5d04d5ebad816f43f |
| 3 | 0xafe97a6d299e43fb066ae47ba597a1fe |
| 4 | 0x5c9e120780cb2675b6e92282d104968d |

In Table 1, the first three checksums corresponding to numbers −3 to −1 identify the original content of each sector. The checksums 0-4 reflect the instructions in the update package. The checksums appear in the same order as the instructions in the package, so that checksum 0 corresponds to the first instruction, and so on. Each checksum reflects the content of a sector after the corresponding instruction has modified that sector. For example, checksum 0 reflects the result of performing instruction 0 on the corresponding sector.

In step 240, the delta package generator resolves any conflicts between checksums. A conflict exists when two checksums associated with the same sector are the same. For a well-designed checksum algorithm, if one byte changes in a sector, then the resulting checksum will be different from a checksum representing the old data. Since each instruction will modify at least one portion of the sector, checksums associated with the same sector will generally reflect the changed content.

Nevertheless, in some situations the checksum algorithm cannot guarantee this behavior. For example, a 16-byte checksum cannot always uniquely identify 64 KB of data. If a conflict exists, the delta generator employs a different checksum algorithm to generate the checksums until the conflicts are resolved. According to an exemplary embodiment of the present invention, the checksum algorithm employs a strength of MD4 and a length of 16 bytes, but this is not necessary. A stronger and longer checksum may be used for greater robustness.

In step 250, the checksums are inserted into the update package. In addition, information about the old firmware image size, the new firmware image size, and the sector size are also inserted into the update package. This information is used to determine how much data is used to compute the checksum. Most checksums are calculated using all the data in the sector, but if the firmware image size is not a multiple of the sector size, the checksum for the last sector in the image may only use the amount of data belonging to the firmware image. The old firmware size may also be used to determine the number of checksums associated with the prerequisite instructions (i.e., the instructions associated with negative numbers).

The checksums may be inserted into the update package in any order. In the example given in Table 1, the checksums associated with the prerequisite instructions are included first, followed by the checksums associated with the instructions in the update package. However, other orders are possible. For example, the checksums could be stored by sector such that checksums associated with the same sector are stored together.

As described herein, the checksums are stored together in a separate area, such as shown in Table 1. This allows the controller 110 to read the checksums without needing to process the entire update package. However, the checksums may be stored in the update package in any format. For example, the checksums may be stored immediately following the instruction they are associated with.

The update package having the checksums is transmitted to the mobile terminal 100 in order to update the firmware on the mobile terminal 100. The controller 110 reads the instructions in the update package and applies the instructions to the firmware in order. Under normal conditions, the controller 110 applies every instruction in the update package to the firmware, resulting in a fully updated firmware version. However, if the update process is interrupted (for example due to a power loss), the controller 110 executes a recovery process. A recovery process according to an exemplary embodiment of the present invention is described below with respect to FIGS. 3-8.

Figure 3:
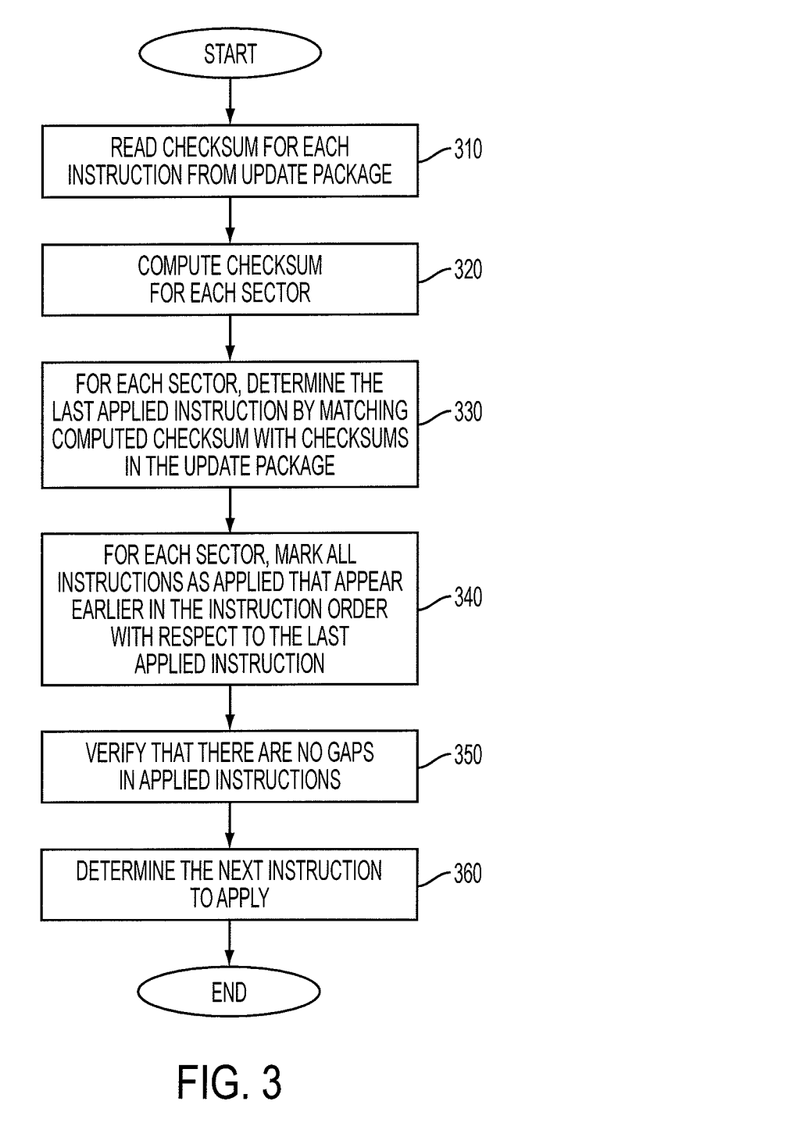
FIG. 3 is a flowchart of a method of recovering from a fault in a Firmware-Over-The-Air (FOTA) update process according to an exemplary embodiment of the present invention.

FIG. 3 is a flowchart of a method of recovering from a fault in a FOTA update process according to an exemplary embodiment of the present invention.

Referring to FIG. 3, the controller 110 determines that a recovery is needed because the update was not completed. Accordingly, the firmware of the mobile terminal 100 may be assumed to be in a partially updated state in which an unknown number of instructions in the update package were applied. The controller 110 may determine the last instruction applied to the firmware via the processes described below.

At the beginning of the recovery process, the controller 110 does not know how many of the instructions in the update package were applied to the firmware. It is entirely possible that the update process was terminated before any instructions were applied to the firmware, in which case the partially updated firmware will correspond entirely to the original firmware version. Similarly, the update process could have been terminated after all instructions were applied but before the update process could complete normally. In this case, the partially updated firmware will correspond to the new firmware version. However, the controller 110 has no way to tell, at the outset, whether these two situations have occurred. Accordingly, for the purposes of the recovery process, the controller 110 assumes that the firmware is in a partially updated state in which an unknown number of instructions in the upgrade package have been applied to the firmware.

In step 310, the controller 110 begins the recovery process by obtaining the checksum associated with each instruction in the update package. This operation is described below in more detail with respect to FIG. 4.

In step 320, the controller 110 computes the checksum for each sector of the firmware. As noted above, these checksums reflect the partially updated state of the firmware. The sectors which were successfully modified by the update process will have checksums that are the same as the checksum associated with the last instruction in the update package that was applied to that sector. Sectors which were not modified by the update process (either because the process terminated before that sector could be modified or the sector was not changed by the update package) will have checksums matching the original sector checksum associated with that sector in the update package. Sectors which were partially modified by the update package (because not all of the instructions modifying that sector were successfully applied) will have a checksum that is the same as the checksum associated with the last instruction in the update package that was successfully applied to that sector. By matching the calculated checksums with the checksums in the update package, the controller 110 may determine which instructions were last applied for each sector.

In step 330, the controller 110 determines, for each sector, the last applied instruction for that sector. The last applied instruction is generally the instruction for which the associated checksum matches the checksum for the sector calculated in step 320. The operations in steps 320 and 330 are described below in more detail with respect to FIG. 5.

In step 340, the controller 110 marks as applied all instructions for a given sector that appear earlier in the instruction order with respect to the last applied instruction for that sector. This operation is described below in more detail with respect to FIG. 6.

In step 350, the controller 110 verifies that no gaps between applied instructions exist. A gap occurs when a later instruction is marked as applied and an earlier instruction is not marked as applied. In the example given above with respect to Table 1, a gap may occur when instruction 2 is marked as applied, instruction 4 is marked as applied, but instruction 3 is not marked as applied. This situation violates the presumption that each instruction is applied in order, and indicates that an unrecoverable error occurred in the update or recovery process. This operation is described below in more detail with respect to FIG. 7.

In step 360, the controller 110 determines the next instruction to apply in the update process based on the last applied instruction. Generally, the next instruction will be the instruction immediately following the applied instruction having the highest instruction number. This operation is described below in more detail with respect to FIG. 8.

Figure 4:
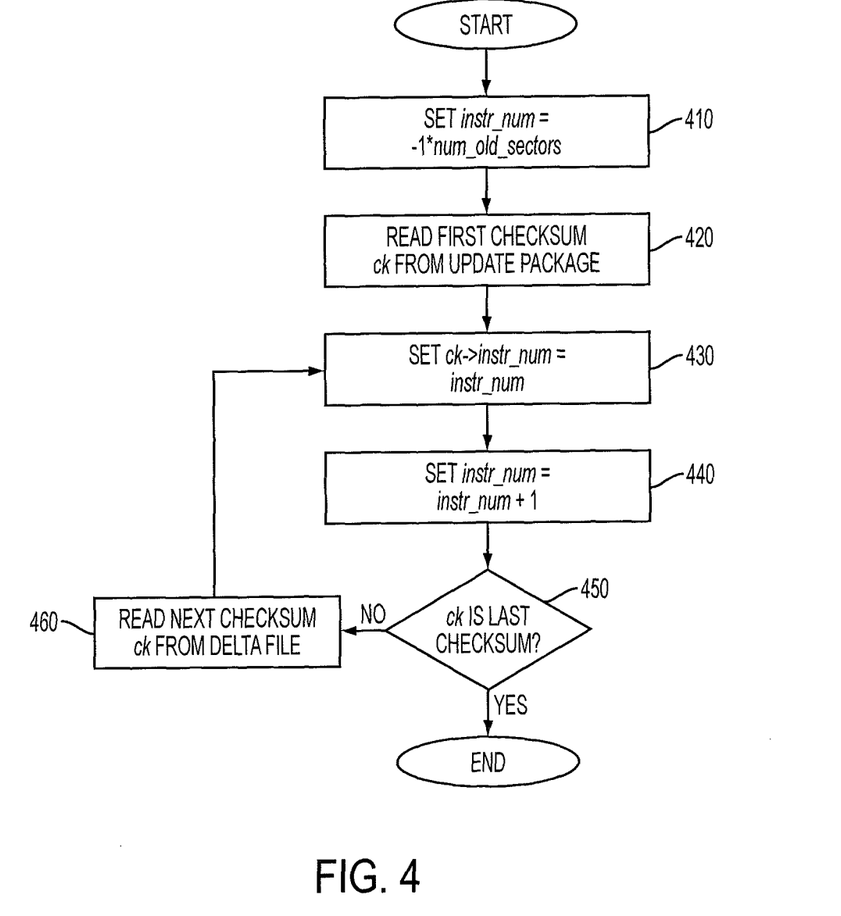
FIG. 4 illustrates a process of assigning instruction numbers to checksums in an update package according to an exemplary embodiment of the present invention.

FIG. 4 illustrates a process of assigning instruction numbers to checksums in an update package according to an exemplary embodiment of the present invention.

Referring to FIG. 4, in step 410, the controller 110 initializes a current instruction number to $-1*(\text{num\_old\_sectors})$, where num_old_sectors represents the number of sectors in the original version of the firmware. Assuming that the checksums are arranged in the order shown in Table 1, the first checksums read from the update package are checksums for the sectors in the original version of the firmware, and correspond to the prerequisite instructions. Accordingly, these checksums should be assigned negative instruction numbers.

In step 420, the controller 110 reads the first checksum ck from the package. In step 430, the controller 110 assigns to the currently read checksum ck the current instruction number instr_num. In step 440, the controller 110 increments the current instruction number instr_num by one.

In step 450, the controller 110 determines whether the currently read checksum ck is the last checksum. If the currently read checksum is not the last checksum in the update package, the controller 110 reads the next checksum from the update package in step 460, designates the next checksum as the currently read checksum ck, and returns to step 430. If the currently read checksum ck is the last checksum, then all of the checksums in the update package have been assigned instruction numbers and the controller 110 computes the checksum of each sector in step 320 of FIG. 3.

Figure 5:
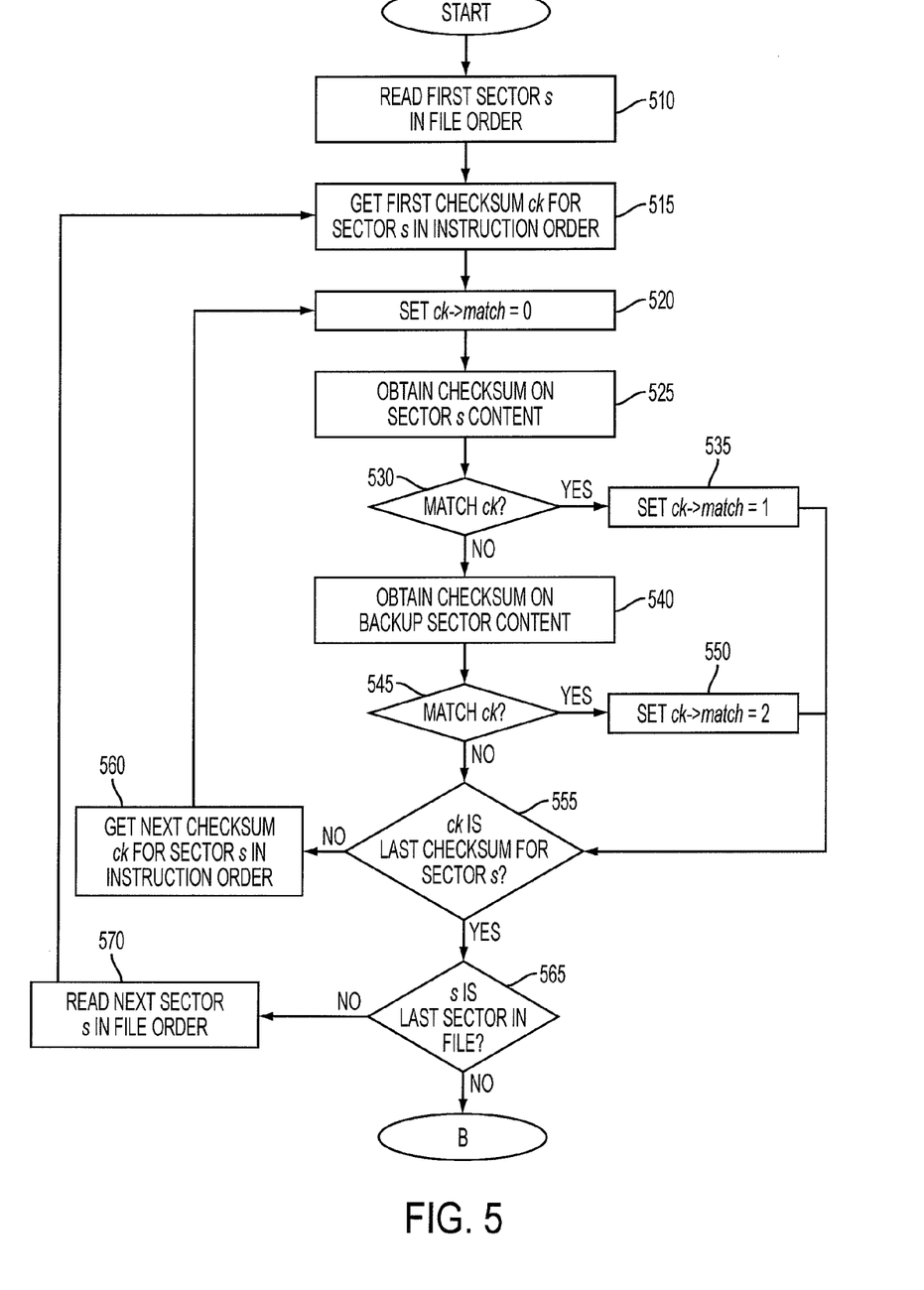
FIG. 5 illustrates a process of determining whether checksums of an update package match checksums of a firmware sector of a mobile terminal according to an exemplary embodiment of the present invention.

FIG. 5 illustrates a process of determining whether checksums of an update package match checksums of a firmware sector of a mobile terminal according to an exemplary embodiment of the present invention.

Referring to FIG. 5, the controller 110 selects a sector s of the firmware for analysis in step 510. In step 510, the controller 110 begins by selecting the first sector of the firmware as the sector s. The sectors of the firmware are read and analyzed in file order from the first sector to the last sector. As discussed above, if the size of the firmware is not a multiple of the sector size, the last sector of the firmware may not correspond to an entire sector of the storage unit on which the firmware is stored. In this case, the controller 110 will only consider the firmware data from the last sector.

In step 515, the controller 110 selects from the update package an instruction checksum ck for the sector being analyzed. The first instruction checksum ck_selected is the checksum associated with the first instruction that modifies the sector under analysis. For example, if the sector being analyzed is sector 0, and sector 0 is modified by instructions 3, 9, and 10, the first instruction checksum ck is the checksum associated with instruction 3. Accordingly, the controller 110 selects the checksum associated with instruction 3 first in step 515. In the next iteration of the analysis of the firmware sector, the controller 110 will select the checksum associated with instruction 9, followed by the checksum associated with instruction 10.

In step 520, the controller 110 sets a checksum match value match to 0, indicating that no match has been determined for the instruction checksum under analysis. The checksum match value match indicates whether the instruction checksum ck_matches the checksum of the sector s under analysis.

In step 525, the controller 110 obtains the checksum associated with the firmware sector s. The controller 110 may calculate this checksum once and store the calculated checksum in memory for later retrieval, or may calculate the checksum each time. In some cases, the checksum may need to be recalculated. For example, the checksum may need to be recalculated if the length of the data is different, which may occur when the original firmware sector and the modified firmware sector have different lengths.

In step 530, the controller 110 determines whether the instruction checksum ck_matches the checksum determined in step 525. If the checksums match, then the controller 110, in step 535, sets the checksum match value match to 1, indicating that the checksum associated with the firmware under analysis (i.e., the checksum calculated in step 525) matches the instruction checksum ck. Thereafter, the process proceeds to step 555, which is described further below.

If the checksums do not match, the controller 110 obtains a backup checksum associated with a backup sector of the sector s under analysis, and determines in step 540 whether the instruction checksum ck_matches the checksum of the backup sector. As with step 525, if the backup checksum was not previously calculated, the controller 110 may calculate the backup checksum in step 540. In step 545, the controller 110 determines whether these checksums match. If these checksums match, the controller 110 sets the checksum match value match to 2 in step 550, indicating that the instruction checksum ck_matches the checksum for the backup sector. If these checksums match in step 545 or after controller 110 sets the checksum match value match to 2 in step 550, the process proceeds to step 555.

In step 555, the controller 110 determines whether the instruction checksum ck is the last checksum for the sector s under analysis. If the instruction checksum ck is not the last checksum, the controller 110 obtains the checksum associated with the next instruction for the sector s under analysis in step 560, and assigns this checksum as the instruction checksum ck. The controller 110 then repeats steps 520-555.

If the instruction checksum ck is the last checksum for the sector s under analysis, the controller 110 determines whether the sector under analysis is the last sector of the firmware in step 565. If the sector s under analysis is not the last sector of the firmware, the controller 110 selects the next sector of the firmware, in order, assigns this sector as the sector s under analysis in step 570, and repeats steps 515-565. If the sector s under analysis is the last sector of the firmware, the controller 110 steps through each instruction in the update process to determine whether the instruction was applied. This process is described below in more detail with respect to FIG. 6.

Figure 6:
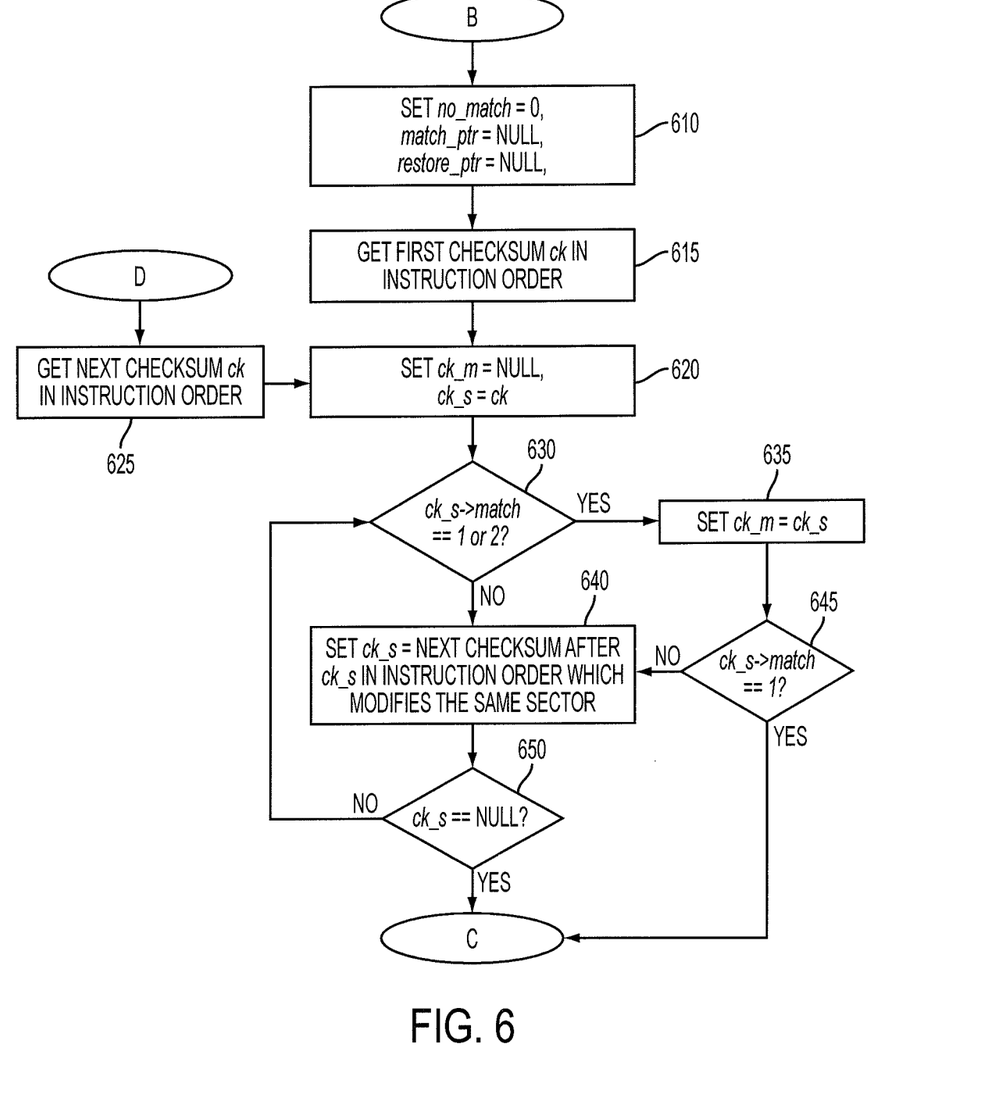
FIG. 6 illustrates a process for determining whether an instruction in an update package was applied according to an exemplary embodiment of the present invention.

FIG. 6 illustrates a process for determining, for each sector, the last instruction in an update package that was applied to a firmware, according to an exemplary embodiment of the present invention.

Referring to FIG. 6, the controller 110 initializes a no match value no_match, a match pointer match_ptr, and a restore pointer restore_ptr in step 610. The no match value no_match indicates whether an instruction has been found that has not yet been applied, and has a value of 1 if such a no match has been found, and 0 otherwise. The match pointer match_ptr points to the checksum of the last instruction that has been found to have been applied. The restore pointer restore_ptr points to the checksum of an instruction that matches the checksum of the backup sector. The restore pointer restore_ptr indicates how to use the backup sector in the recovery process.

In step 615, the controller 110 obtains the first checksum ck in the update package, in instruction order. As the checksums in the update package include checksums corresponding to prerequisite instructions having negative numbers, the first checksums to be analyzed will be the checksums associated with the prerequisite instructions, followed by the checksums associated with the instructions in the update package.

In step 620, the controller 110 initializes a checksum ch_m and sets a checksum ck_s to the checksum ck. The checksum ck_m tracks the checksum that last had a match value match of 1 or 2. In step 630, the controller 110 determines whether the checksum match value match of the checksum ck_s (determined in FIG. 5) has a value of 1 or 2. If the checksum ck_s does not have a value of 1 or 2, then the checksum ck_s did not match any of the checksums of the firmware sector. Accordingly, the controller 110 will obtain the checksum associated with the next instruction that modifies the same sector as the instruction associated with the checksum ck_s, and determine whether that checksum has a match. The controller 110 continues this operation until a match is found or no matches exist. This operation is described below with respect to steps 630-650.

If the checksum match value match of the checksum ck_s does not have a value of 1 or 2, then in step 640 the controller 110 sets the checksum ck_s to the next checksum that is associated with an instruction that modifies the same sector as the instruction associated with the checksum ck_s. For example, if the checksum ck_s is associated with an instruction that modifies sector 7, then in step 640 the controller 110 sets the checksum ck_s to the checksum associated with the next instruction, in order, that modifies sector 7.

In step 650, the controller 110 determines whether the updated checksum ck_s has a NULL value. This may occur when the previous checksum ck_s was associated with the last instruction to modify a particular sector. If the updated checksum ck_s is not NULL, i.e., another instruction modified the sector associated with the checksum ck_s, the controller 110 repeats steps 630-650 with respect to the updated checksum ck_s. If the updated checksum ck_s is null, the controller 110 verifies that no gaps exist in the modified instructions. This process is described below with respect to FIG. 7.

If the checksum ck_s is associated with a prerequisite instruction, then the next instruction (if any) will be an instruction in the update package. Since the prerequisite instructions correspond to the original content of a firmware sector, and not actual instructions in the update package, each sector only has one corresponding prerequisite instruction. Accordingly, if the checksum ck_s is associated with a prerequisite instruction, then the next instruction (if any) associated with that sector will be an instruction in the update package.

If the controller 110 determines in step 630 that checksum match value for the checksum ck_s does have a value of 1 or 2, (i.e., the checksum ck_s matches the checksum for the sector modified by the instruction that is associated with the checksum ck_s), then the controller 110 sets the checksum ck_m as the checksum ck_s in step 635. The checksum ck_m tracks the checksum that last had a match value match of 1 or 2. The controller 110 determines in step 645 whether the checksum match value match for the checksum ck_s has a checksum match value of 1, indicating that the checksum ck_s matches a checksum associated with an instruction in the update package. If the checksum match value for the checksum ck_s does not have a value of 1, i.e., the checksum match value for the checksum ck_s has a value of 2, the controller 110 updates the checksum ck_s in step 640 as described above. This represents a preference for a match in the firmware over a match in the backup sector.

A match value of 1 indicates that the checksum ck_s matches the checksum of the sector modified by the instruction associated with the checksum ck_s. This indicates, in turn, that the instruction associated with the checksum ck_s has been applied to the corresponding sector of the firmware. Accordingly, the controller 110 then verifies that no gaps exist in the applied instructions. This process is described below in FIG. 7.

Figure 7:
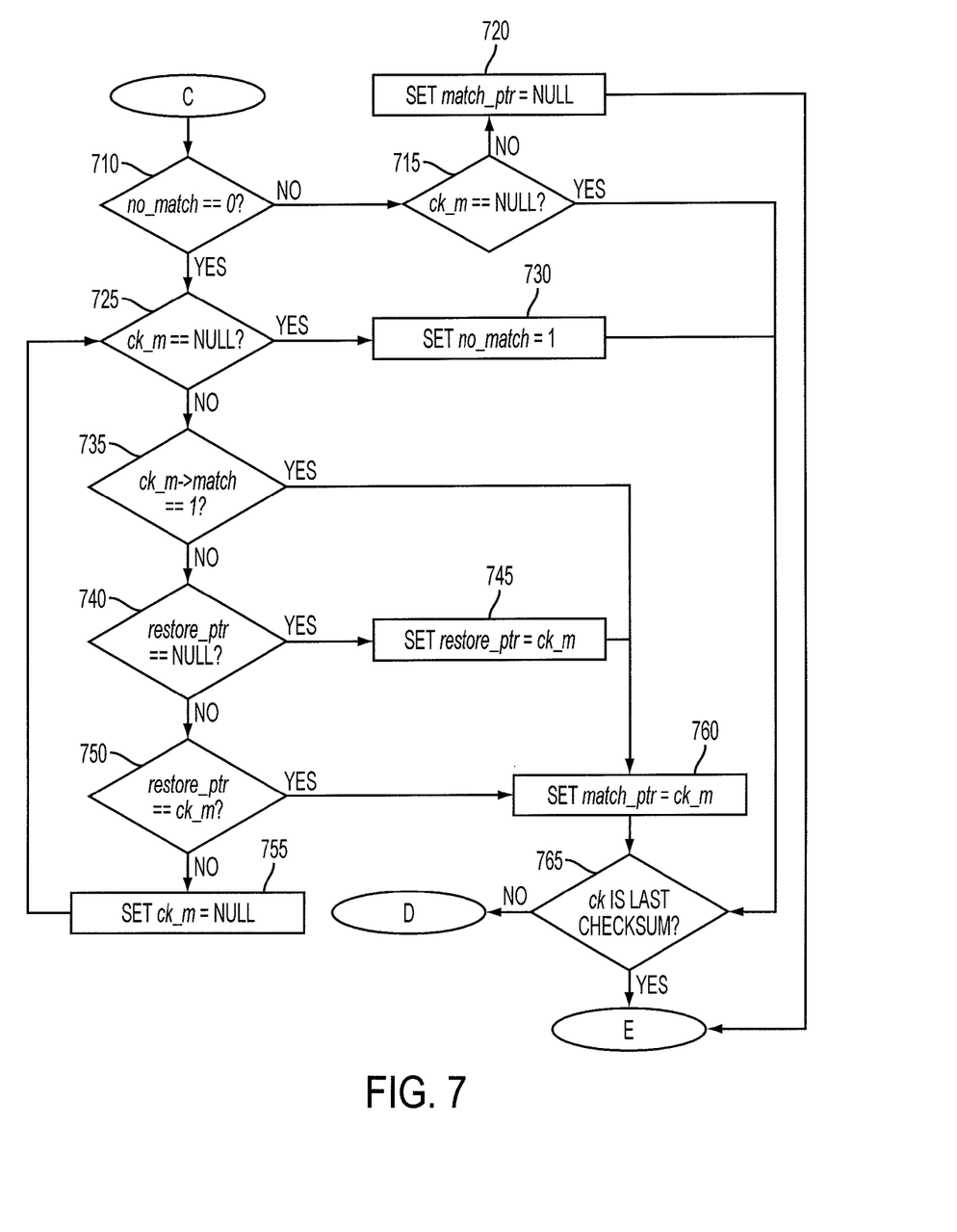
FIG. 7 illustrates a process of verifying that no gaps exist in instructions applied to the same sector of a partially updated firmware of a mobile terminal according to an exemplary embodiment of the present invention.

FIG. 7 illustrates a process of verifying that no gaps exist in instructions applied to a partially updated firmware of a mobile terminal according to an exemplary embodiment of the present invention.

Referring to FIG. 7, in step 710, the controller 110 determines whether the no match value no_match is 0. If the value of the no match value no_match is not 0, then at least one previous instruction was not applied to the firmware. Accordingly, the controller 110 determines in step 715 whether the checksum ck_m is NULL. If the checksum ck_m is not null, then the controller 110 sets the match pointer match_ptr to NULL in step 720 and stops analyzing the checksums. This situation corresponds to an error in which the checksum analysis indicates that one instruction was not applied but a later instruction was applied (and the checksum ck_m was set to a non-NULL value.) As the instructions are applied in order, this result suggests that an error occurred. Accordingly, the controller 110 sets the match pointer match_ptr to NULL to indicate the presence of the error.

If the checksum ck_m is NULL in step 715, the controller 110 proceeds to step 765. This indicates that the controller 110 did not find a match, either for the checksum ck or for a checksum associated with any later instruction that modified the same sector as the checksum ck. Since the no match value no_match is not 0, a previous instruction was not applied, and since the checksum ck_m is NULL, the instruction corresponding to the current checksum was also not applied. Accordingly, there is no error, and the controller continues analyzing the checksums in step 765.

If the no match value no match is 0 in step 710, then the controller 110 determines whether the checksum ck_m is NULL in step 725. If the checksum ck_m is NULL, then the controller 110 sets the no match value no_match to 1 in step 730 and proceeds to step 765. This indicates that the instruction corresponding to the current checksum is the first instruction that was not applied to the firmware.

If the checksum ck_m is not NULL in step 725, the controller 110 determines whether the match value for the checksum ck_m is 1 in step 735. If the checksum ck_m is not null, then at least one instruction that modifies the same sector as the instruction corresponding to the checksum ck has been applied. Accordingly, either the match value for the checksum ck is 1 or 2, or a checksum associated with a later instruction that modifies the same sector as the instruction associated with the checksum ck has a match value of 1 or 2. This indicates that the match value for the checksum ck_m matches either a checksum of a firmware sector, or the checksum of the backup sector.

If the match value for the checksum is 1 in step 735, then the controller 110 sets the match pointer match_ptr to the checksum ck_m in step 760. If the match value for the checksum ck_m is not 1, then the controller 110 determines whether the restore pointer restore_ptr is NULL in step 740. If the restore pointer restore_ptr is NULL, then the controller 110 sets the restore pointer restore_ptr to the checksum ck_m in step 745 and proceeds to step 760.

If the restore pointer restore_ptr is not NULL in step 740, the controller 110 determines whether the restore pointer restore_ptr is set to the checksum ck_m in step 750. If the restore pointer restore_ptr is not NULL, then a previous checksum ck_m was assigned to the restore pointer restore_ptr. If the restore pointer restore_ptr is set to the checksum ck_m, then the controller 110 sets the match pointer match_ptr to the checksum ck_m in step 760, and proceeds to step 765. If the restore pointer restore_ptr is not set to the checksum ck_m, then two checksums match the checksum of the backup sector, indicating that an error may have occurred. Because there is only one backup sector, only one checksum should match the backup sector. Accordingly, the controller 110 sets the checksum ck_m to NULL in step 755 and returns to step 725.

In step 765, the controller 110 determines whether the checksum ck is the last checksum in the update package. If the checksum ck is not the last checksum in the update package, the controller 110 returns to step 625 of FIG. 6 and sets the checksum ck as the next checksum of the update package, in instruction order. The controller 110 then returns to step 620 and repeats the algorithm shown in FIGS. 6 and 7 with respect to the next checksum. If the checksum ck is the last checksum in the update package, the controller 110 determines which instruction in the update package was the last instruction applied. This operation is described below with respect to FIG. 8.

Figure 8:
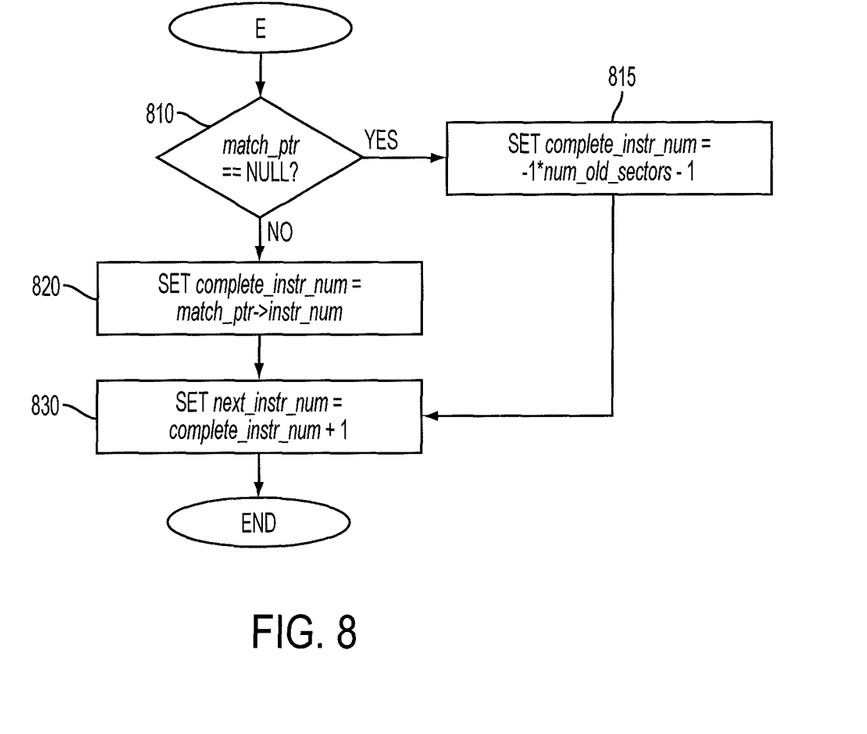
FIG. 8 illustrates a process of determining a next instruction of an update package to apply in a recovery process according to an exemplary embodiment of the present invention.

FIG. 8 illustrates a process of determining a next instruction of an update package to apply in a recovery process according to an exemplary embodiment of the present invention.

Referring to FIG. 8, the controller 110 determines in step 810 whether the match pointer match_ptr is set to NULL. If the match pointer match_ptr is not set to NULL, the controller 110 determines in step 820 that the number of the last completed instruction corresponds to the number of the instruction associated with the checksum referenced by the match pointer match_ptr.

If the match pointer match_ptr is set to NULL in step 810, the controller 110, in step 815, determines that an error has occurred and the update process cannot be recovered. Accordingly, the controller 110 determines that the last completed instruction number is a negative number, specifically (−1*the number of old sectors) −1. Alternatively, the controller 110 could set the last completed instruction number as any negative number less than or equal to −2, in order to ensure that the number of the next instruction to be applied is a negative number, thereby indicating the presence of an unrecoverable error. If there are no prerequisite instructions, i.e., the number of sectors in the original firmware is 0, then the controller 110 may set the last instruction completed to −1 according to the above formula, in order to enable the update process to resume from the beginning.

In step 830, the controller 110 determines the next instruction to apply. The controller 110 adds 1 to the number of the last completed instruction and determines whether the result is negative. If number of the next instruction to apply is 0 or greater, then the controller 110 determines that recovery is possible and that the update process may resume with the instruction having the number corresponding to the number of the next instruction to apply. If the number of the next instruction to apply is negative, the controller 110 determines that an error has occurred and the update process cannot resume. In this case, the controller 110 may generate an error message indicating that the recovery process could not be completed.

If the number of the next instruction to apply is greater than the number of instructions in the update package (i.e., the last instruction completed was the last instruction in the update package), the controller 110 may determine that all of the instructions in the update package were in fact applied before the interruption occurred. In this case, the controller 110 may, instead of applying any instructions in the update package, perform any final operations for completing the update.

Although the exemplary embodiment described above includes a checksum for each instruction in the update package, in some cases the number of checksums in the update package may be reduced. For example, if a series of consecutive instructions modify the same sector, the series of instructions may be interpreted as a single "super instruction" modifying that sector. Typically, a firmware sector to be updated is copied to a Random Access Memory (RAM) buffer, and the instruction is applied to the copy in the RAM buffer. The sector is not copied back to non-volatile memory until another instruction needs to be applied that modifies a different sector. As a result, the sector in the non-volatile memory will remain the same until the last instruction in the series is carried out and the contents of the RAM buffer are copied back to the sector in the non-volatile memory. Accordingly, in this case, the update package may include only a checksum for the last instruction in the series. For update packages having thousands of instructions, this process may significantly reduce the number of checksums needed.

The updated firmware may be larger than the original firmware. In this case, the updated firmware will take up more sectors of the non-volatile memory than the original firmware. These additional original sectors beyond the end of the original firmware may unintentionally match a checksum in the update package, indicating that the update process is further along than it actually was. According to an exemplary embodiment of the present invention, the controller 110 may detect and compensate for these rare circumstances.

According an exemplary embodiment of the present invention, if the implementation of the 2-phase commit algorithm is to write the original contents of a sector to the backup sector, as opposed to the modified contents, then one additional step can be taken to ensure correctness. In this case, a checksum X should only match the contents of the backup sector if there is another checksum Y for the same sector which comes after checksum X in instruction order. The update client only copies a sector to the backup sector if the next step is to erase that sector and then update that sector.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for recovering from an interruption in an update procedure for updating a firmware of a mobile terminal, the method comprising:
   computing a checksum for each sector of a partially updated firmware;
   for each sector of the partially updated firmware, determining a last instruction in an update package that was applied to that sector, based on checksums included in the update package and the computed checksums of the sectors of the partially updated firmware;
   determining a last instruction of the update package that was applied to the partially updated firmware prior to the interruption based on the last instruction applied to each sector; and
   resuming the update procedure starting from an instruction immediately following the last applied instruction.

2. The method of claim 1, further comprising:
   for each sector, determining as having been applied each instruction in the update package that occurred prior to the last applied instruction for that sector.

3. The method of claim 1, further comprising:
   verifying that no gaps in applied instructions exist in the update package.

4. The method of claim 3, further comprising:
   determining that recovery is not possible when a gap in applied instructions exists in the update package.

5. The method of claim 1, wherein the update package includes:
   a plurality of instructions arranged in a numerical order starting from 0, each instruction modifying exactly one sector of a firmware of a mobile terminal;
   a first plurality of checksums, each associated with one of the plurality of instructions; and
   a second plurality of checksums, each associated with an original firmware sector, the original firmware sector corresponding to a sector of the firmware prior to execution of the update process.

6. The method of claim 5, further comprising:
   assigning an instruction number to each checksum of the update package.

7. The method of claim 6, wherein the assigning of the instruction number comprises:
   for each checksum in the second plurality of checksums, assigning a negative instruction number to the checksum; and
   for each checksum in the first plurality of checksums, assigning an instruction number to the checksum, the instruction number corresponding to the order in which the instruction associated with the checksum appears in the update package.

8. The method of claim 6, wherein the determining of the last instruction applied to each sector comprises:
   analyzing each checksum in the update package in order based on the instruction number assigned to each checksum, so as to determine which checksums in the update package match the checksums of the sectors of the partially updated firmware; and
   for each sector, determining the last instruction applied to the sector based on the results of the analysis.

9. The method of claim 8, wherein the analyzing of each checksum in the update package comprises:
   analyzing each checksum in the update package in order, so as to determine which checksums in the update package match the checksums of the sectors of the partially updated firmware or a checksum of a backup sector of the partially updated firmware.

10. The method of claim 8, wherein the analyzing of each checksum in the update package comprises:
    analyzing each of the second plurality of checksums prior to analyzing each of the first plurality of checksums.

11. The method of claim 10, wherein the analyzing of each checksum in the update package comprises:
    for each checksum in the update package,
    determining whether the checksum matches a checksum of a sector of the updated firmware;
    when the checksum does not match a checksum of a sector of the partially updated firmware, determining whether a checksum of a later instruction modifying the same sector of the partially updated firmware matches the checksum of the sector of the partially updated firmware, and
    when the checksum matches a checksum of the sector of the partially updated firmware or when the checksum of the later instruction matches the sector of the partially updated firmware, updating a match pointer based on the results of the determination.

12. The method of claim 11, wherein the determining of the last instruction applied to the partially updated firmware comprises:
    after analyzing all checksums in the update package, determining the last instruction applied to the partially updated firmware based on the match pointer.

13. A terminal having a firmware updatable by a Firmware-Over-The-Air (FOTA) update operation, the terminal comprising:
    a communication unit for receiving an update package for a firmware, the update package comprising a plurality of instructions, each instruction modifying exactly one sector of the firmware;
    a storage unit having the firmware stored thereon; and
    a processor for, when an update process to update the firmware based on the update package is interrupted such that the firmware stored on the storage unit is a partially updated firmware:
    computing a checksum for each sector of the partially updated firmware,
    for each sector of the partially updated firmware determining a last instruction in the update package that was applied to that sector based on checksums included in the update package and the computed checksums of the sectors of the partially updated firmware,
    determining a last instruction of the update package that was applied to the partially updated firmware prior to the interruption, and
    resuming the update procedure starting from an instruction immediately following the last applied instruction.

14. The terminal of claim 13, wherein the processor determines, for each sector, that every instruction has been applied that occurs prior to the last instruction applied to the sector.

15. The terminal of claim 13, wherein the processor verifies that no gaps in applied instructions exist in the update package.

16. The terminal of claim 15, wherein the processor determines that resuming the firmware update is not possible when a gap in applied instructions exists in the update package.

17. The terminal of claim 13, wherein the update package comprises:

the plurality of instructions arranged in a numerical order starting from 0, each instruction modifying exactly one sector of the firmware stored in the storage unit;

a first plurality of checksums, each associated with one of the plurality of instructions; and a second plurality of checksums, each associated with an original firmware sector, the original firmware sector corresponding to a sector of the firmware stored in the storage unit prior to execution of the update process.

18. The terminal of claim 15, wherein the processor assigns an instruction number to each checksum of the update package.

19. The terminal of claim 18, wherein the processor assigns a negative instruction number to each checksum in the second plurality of checksums, and the processor assigns a non-negative instruction number to each checksum in the first plurality of checksums, and wherein the instruction numbers assigned to the first plurality of checksums are assigned in an order corresponding to the order in which the instructions appear in the update package.

20. The terminal of claim 18, wherein the processor analyzes each checksum in the update package in order based on the instruction numbers assigned to the checksums, so as to determine which checksums in the update package match the checksums of the sectors of the partially updated firmware or a checksum of a backup sector of the partially updated firmware, and wherein the processor determines the last instruction applied to each sector based on the results of the analysis.

21. The terminal of claim 20, wherein the processor analyzes each of the second plurality of checksums prior to analyzing each of the first plurality of checksums.

22. The terminal of claim 20, wherein, for each checksum in the update package:

the processor determines whether the checksum matches a checksum of a sector of the partially updated firmware, the processor determines, when the checksum does not match a checksum of a sector of the partially updated firmware, whether a checksum of a later instruction modifying the same sector of the partially updated firmware matches the checksum of the sector of the partially updated firmware, and when the checksum matches a checksum of the sector of the partially updated firmware or when the checksum of the later instruction matches the sector of the partially updated firmware, updating a match pointer based on the results of the determination.

23. The method of claim 22, wherein, after the processor analyzes all checksums in the update package, the processor determines the last instruction applied to the partially updated firmware based on the match pointer.

24. A method for generating an update package for updating a firmware stored in a terminal, the method comprising:

generating a plurality of instructions, each instruction modifying exactly one sector of the firmware;

for each sector of an original firmware, generating a checksum corresponding to that sector, and assigning the checksum a negative instruction number;

generating a plurality of checksums corresponding to the plurality of instructions;

assigning each checksum an instruction number corresponding to the instruction number of the corresponding instruction;

inserting the generated plurality of instructions and any associated content into the update package; and inserting the generated checksums into the update package.

25. The method of claim 24, wherein the inserting of the generated checksums comprises:

inserting the generated checksums into the update package in an order corresponding to the order of the instruction numbers.

26. The method of claim 24, wherein the inserting of the generated checksums comprises:

inserting the generated checksums into the update package in an order corresponding to sectors of the firmware associated with the generated checksums.

27. The method of claim 24, wherein the generating of the checksums comprises:

for each series of two or more consecutive instructions modifying the same sector of the firmware, generating a checksum corresponding to the last instruction in the series; and for each instruction in the instruction package that is not in a series of two or more consecutive instructions, generating a checksum corresponding to the instruction.

* * * * *